US009315161B2

(12) United States Patent
Volmering

(10) Patent No.: US 9,315,161 B2
(45) Date of Patent: Apr. 19, 2016

(54) CARGO BED SYSTEM

(71) Applicant: Robert Volmering, White Lake, MI (US)

(72) Inventor: Robert Volmering, White Lake, MI (US)

(*) Notice: Subject to any disclaimer, the term of this patent is extended or adjusted under 35 U.S.C. 154(b) by 0 days.

(21) Appl. No.: 14/072,371

(22) Filed: Nov. 5, 2013

(65) Prior Publication Data

US 2014/0124552 A1    May 8, 2014

Related U.S. Application Data

(60) Provisional application No. 61/722,494, filed on Nov. 5, 2012.

(51) Int. Cl.
*B60R 11/06* (2006.01)
*B60P 3/14* (2006.01)

(52) U.S. Cl.
CPC .. *B60R 11/06* (2013.01); *B60P 3/14* (2013.01)

(58) Field of Classification Search
CPC ............ B60R 9/00; B60R 9/02; B60R 11/06; B60R 7/02; B60P 3/14
USPC ............................ 224/404; 296/37.6; 410/140
See application file for complete search history.

(56) References Cited

U.S. PATENT DOCUMENTS

| 3,596,976 | A |   | 8/1971 | Eitel et al. |
| 4,394,100 | A |   | 7/1983 | Sperlich |
| 4,733,898 | A | * | 3/1988 | Williams .................... 296/24.32 |
| 4,830,242 | A | * | 5/1989 | Painter ........................ 224/42.32 |
| 4,938,519 | A |   | 7/1990 | Schlachter |
| 5,382,069 | A |   | 1/1995 | Chambers |
| 5,597,193 | A | * | 1/1997 | Conner ......................... 296/37.6 |
| 5,634,487 | A | * | 6/1997 | Downey ................... 137/355.12 |
| 5,772,271 | A |   | 6/1998 | Sanders |
| 5,897,154 | A |   | 4/1999 | Albertini et al. |
| 5,927,783 | A |   | 7/1999 | Baka |
| 5,996,868 | A | * | 12/1999 | Paradis ......................... 224/404 |
| D426,187 | S | * | 6/2000 | Shultz ....................... D12/414.1 |
| 6,135,527 | A | * | 10/2000 | Bily ............................. 296/37.6 |
| 6,241,137 | B1 |   | 6/2001 | Corr |
| 6,641,013 | B2 | * | 11/2003 | Dise ............................. 224/404 |
| 6,644,712 | B1 | * | 11/2003 | Rafi-Zadeh .................. 296/37.8 |
| 7,794,003 | B2 | * | 9/2010 | Crandall ...................... 296/37.6 |
| D659,632 | S | * | 5/2012 | Jordan ...................... D12/414.1 |
| 8,317,442 | B2 | * | 11/2012 | Daikuzono ................... 410/140 |
| 2008/0231066 | A1 |   | 9/2008 | Harrell |

OTHER PUBLICATIONS http://forums.ukcdogs.com/printthread.php?s=c754580f968051400fa65f1ba317774e&threadid=485082&perpage=22 (UKC Forums, Custom Built Dog Boxes, Tool Boxes, Storage Boxes & Truck Bed, Jul. 27, 2012).*

* cited by examiner

*Primary Examiner* — Corey Skurdal
(74) *Attorney, Agent, or Firm* — Dinsmore & Shohl LLP

(57) ABSTRACT

A vehicle cargo bed storage system for a flatbed truck that raises a second platform of the flatbed truck to provide storage space between the second platform and the original first platform of the flatbed truck is provided. A plurality of support braces are affixed to the first platform and the second platform is affixed to the support braces so as to be spaced apart from the first platform to define a volume. The plurality of support braces define a plurality of storage compartments within the volume that are accessible about a periphery of the first and second platforms. A plurality of lockable doors about the periphery of the first and second platforms restricts access to the storage compartments.

13 Claims, 3 Drawing Sheets

CARGO BED SYSTEM

CROSS-REFERENCE TO RELATED APPLICATIONS

This application claims priority to U.S. Provisional Application 61/722,494 filed Nov. 5, 2012, the entire contents of which are incorporated herein by reference.

FIELD OF THE INVENTION

The present invention relates to cargo bed systems. More specifically, a cargo bed storage system for flatbed trucks.

BACKGROUND OF THE INVENTION

Flatbed trucks are vehicles with a flat bed or platform for hauling tools, equipment, supplies, and the like. Flatbed trucks generally have a forward passenger compartment or cab that resembles a pickup truck. However, whereas a pickup truck has rear body panels, side walls, and a tailgate to define the cargo bed, flatbed trucks have only a platform extending rearward from the cab of the vehicle.

Flatbed trucks are typically used as commercial work trucks because the rear platform of the truck provides space for hauling oversize equipment and supplies. The rear platform may also be customized by the owner with various storage boxes, platform bodies, or racks to suit the owner's needs. These storage boxes and racks provide lockable compartments in which to store equipment and supplies.

Typically, storage boxes are affixed to either a forward portion of the platform against the vehicle cab, underneath the platform on either side of the vehicle frame, or along the sides of the platform. While these systems provide lockable storage space for the flatbed truck, they often greatly reduce the available surface area of the flatbed truck's platform. Consequently, the flatbed truck suffers a loss in overall utility as owners must choose between lockable storage compartments and a full size platform. For example, if an owner needed the full platform space to haul large items, they would be unable to affix storage boxes onto the surface of the platform.

Typical storage boxes also do not provide lockable storage for oversize items. Owners of flatbed trucks typically haul large items such as lumber, pipe, shovels, or other long items that require the full length of the rear platform. As such, typical storage boxes that extend along only a portion of the platform are unable to accommodate these large items. Owners must therefore haul the items on the platform itself or on racks along the side of the platform. In either event, the oversized items are placed in the open where they are more susceptible to damage and/or theft.

As owners typically store valuable items including tools, equipment, and expensive materials in lockable storage boxes, the boxes are prone to theft. A flatbed truck having a plurality of custom storage boxes affixed to the platform may be targeted by thieves based upon the visibility of the storage boxes and the likelihood that the owner has valuable items inside the boxes.

For the reasons stated above, it would therefore be beneficial to provide owners of flatbed trucks with a storage system that features both lockable storage compartments and a full size platform. It would further be beneficial for the storage system to be durable and able to accommodate equipment of varying sizes and lengths. Finally, the storage system should be easily accessible by the owner while providing lockable storage that is inconspicuous and may serve as a theft deterrent.

SUMMARY OF THE INVENTION

A vehicle cargo bed storage system for a flatbed truck is provided. The cargo bed storage system configuration raises a second platform of the flatbed truck to provide storage space between the second upper platform and a first platform of a flatbed truck. The second platform is spaced apart from the first platform and affixed to a plurality of support braces to define a volume. The support braces divide the volume into a plurality of storage compartments which are accessible about a periphery of the first and second platforms. Finally, a plurality of lockable doors are provided about the periphery of the first and second platforms to restrict access to the storage compartments within the volume. In this way, the cargo bed storage system provides lockable storage within the entire volume between the first and second platforms without sacrificing any of the surface area on the second platform.

The arrangement of the support braces can be altered to accommodate items of various lengths and widths. The storage compartments may be configured to accommodate items having a length up to that of the platforms, or they may be configured for specific, shorter lengths. The compartments may alternatively extend the width of the platform or any other size therebetween.

The support braces may be affixed to the first platform along a longitudinal axis extending orthogonally between a front end of the storage system and a back end of the storage system to create compartments that are accessible about the back end of the storage system. The support braces may alternatively be affixed to the first platform along a transverse axis extending orthogonally between a driver side of the storage system and a passenger side of the storage system to create compartments that are accessible about the driver side and/or the passenger side of the storage system. It is appreciated that the arrangement of the support braces within the volume may be configured to accommodate items of various sizes. For example, combinations of longitudinal and transverse support braces may be used to create compartments sized according to an owner's specification. It is also appreciated that the size of the support braces may be adjusted to increase or decrease the space between the first and second platforms and accordingly increase or decrease the size of the volume.

The support braces may be welded to the first platform or otherwise affixed to the first platform using fasteners as are known in the art. The second platform may in turn be welded to the support braces or otherwise affixed using fasteners as is known in the art. In this way, the second platform is spaced apart from the first platform by the support braces to define the storage volume. The support braces subdivide the volume into a plurality of storage compartments.

The storage compartments are accessible about a periphery of the first and second platforms. The storage compartments may be closed off along the periphery of the platforms using hinged doors, sliding gates, or other lockable closures known in the art. The doors are preferably hinged away from the second platform near the first platform so that when the door is open it hangs down away from the second platform to provide access to the storage compartment. In addition to being lockable, the doors are less conspicuous than other known flatbed truck storage boxes and are less likely to draw attention.

In addition to the storage compartments between the first and second platforms, the cargo bed storage system maintains full utility about the surface of the second platform. For example, known flatbed storage boxes may further be mounted to the second platform. In this way, the cargo bed storage system allows owners to combine the benefits of the present cargo bed storage system with traditional flatbed truck storage boxes. Furthermore, the cargo bed storage system of the present invention maintains compatibility with existing flatbed customization options without unduly increasing cost. In this way, owners can retrofit their flatbed trucks with the cargo bed storage system of the present invention and still make use of any customized flatbed items already owned.

The platforms, support braces, and doors of the cargo bed storage system are preferably made of steel; however, it is appreciated that other materials including aluminum may be used to construct the cargo bed storage system. In this way, the cargo bed storage system provides owners of flatbed trucks with storage compartments that increase the utility and security of the flatbed truck without sacrificing usable storage space on the surface of the platform.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
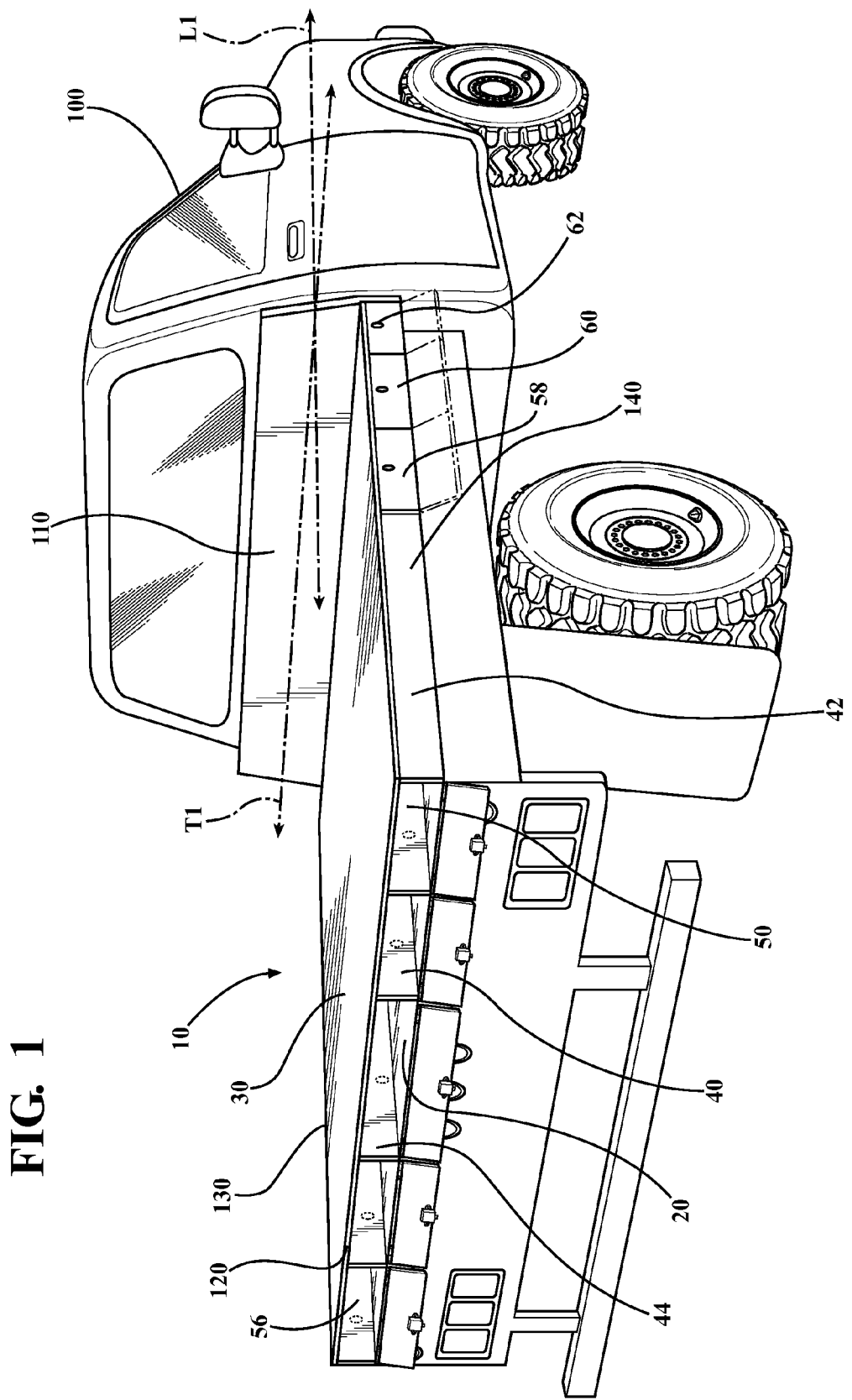
FIG. 1 is a perspective view of a flatbed truck having the cargo bed storage system.

With reference first to FIG. 1, a cargo bed storage system 10 for a vehicle 100 is provided. The cargo bed storage system 10 includes a first platform 20, a second platform 30, and a plurality of support braces 40. The support braces 40 are affixed to the first platform 20. The second platform 30 is in turn affixed to the plurality of support braces 40 so as to be spaced apart from the first platform 20 to define a volume. The support braces 40 define a plurality of storage compartments 50 within the volume. The plurality of storage compartments 50 are accessible about a periphery of the first and second platforms 20, 30. The cargo bed storage system 10 may further have a plurality of lockable doors 60 about the periphery which restrict access to the storage compartments 50.

Figure 2:
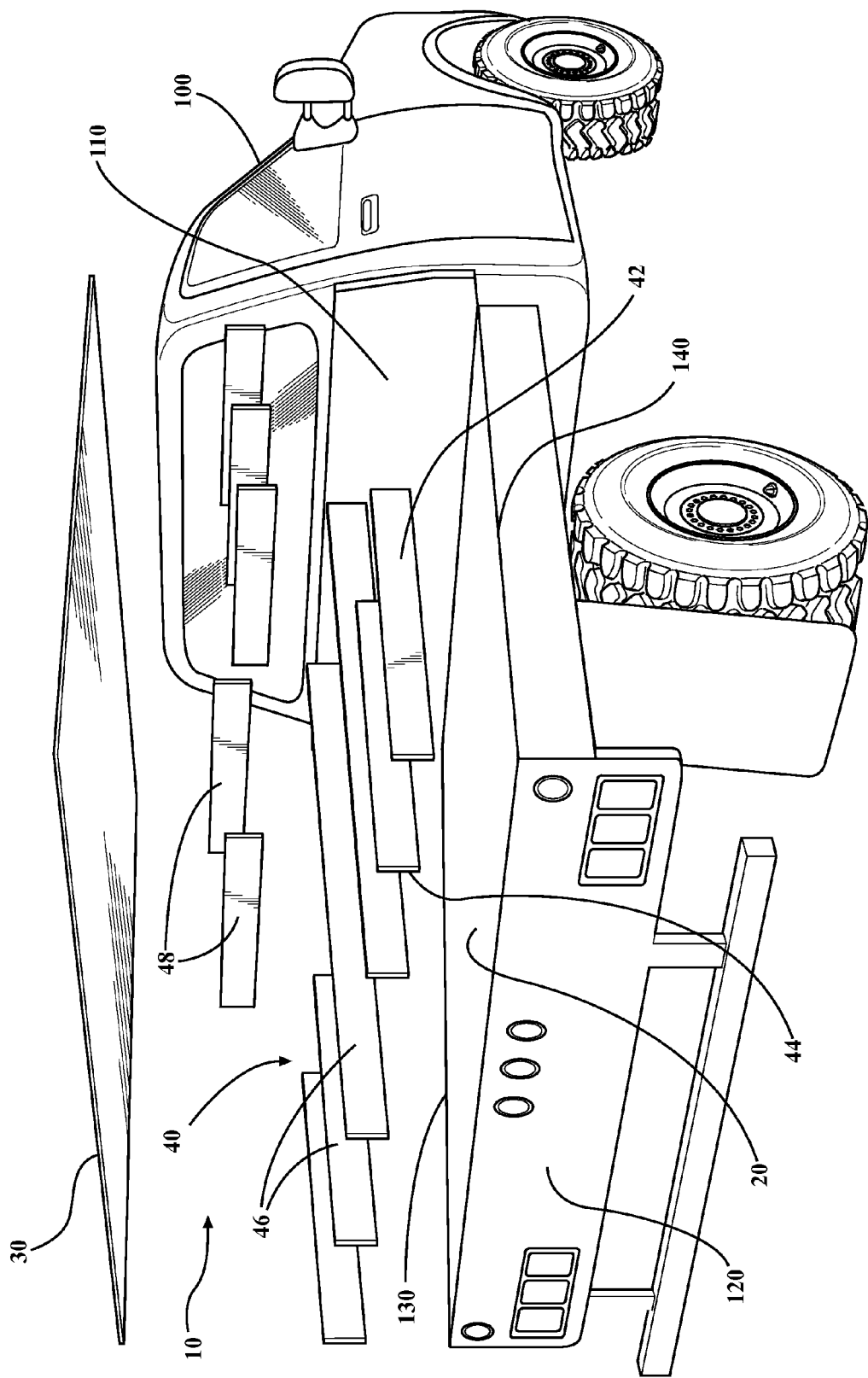
FIG. 2 is an exploded view of the cargo bed storage system.

As shown in the exploded view of FIG. 2, the support braces 40 are affixed to the first platform 20 in a customizable arrangement. In a preferred embodiment, the support braces 40, the first platform 20, and the second platform 30 are made of steel. As such, the support braces 40 are preferably welded to the first platform 20 and the second platform 30 is in turn welded to the support braces 40. However, it is appreciated that alternative resilient materials such as aluminum may be used as a substitute for steel in the assembly of the cargo bed storage system 10. Furthermore, it is appreciated that the support braces 40 may be affixed to the first platform 20 and second platform 30 using fasteners or alternative methods of bonding as is known in the art.

The storage system 10 may have a front end 110, a back end 120, and a longitudinal axis L1 extending orthogonally between the front end 110 and the back end 120. The storage system 10 may further include a driver side 130, a passenger side 140, and a transverse axis T1 extending orthogonally between the driver side 130 and the passenger side 140. Longitudinal support braces 46 are affixed to the first platform 20 along the longitudinal axis L1 to define longitudinal compartments 56 that are accessible about the back end 120 of the storage system 10. Transverse support braces 48 are affixed to the first platform 20 along the transverse axis T1 to define transverse storage compartments 58 which are accessible about the driver side 130 and/or the passenger side 140 of the storage system 10.

The support braces 40 include peripheral support braces 42 and internal support braces 44. The peripheral support braces 42 are affixed along the periphery of the first and second platforms 20, 30 to define a peripheral side of the volume between the first and second platforms 20, 30. Internal support braces 44 are affixed between the first and second platforms 20, 30 within an internal space of the volume to subdivide the volume into storage compartments 50. In an exemplary embodiment of the cargo bed storage system 10, the front end 110 of the storage system 10 abuts the cab of the vehicle 100 so as to close off the front end 110 of the storage system 10. However, it is appreciated that the front end 110 of the storage system 10 may be spaced apart from the cab of the vehicle 100 in which case the front end 110 of the storage system 10 may be left open, closed by a peripheral support brace 42, or accessible via a door 60.

The doors 60 are preferably made of steel or other resilient material. In a preferred embodiment, the doors 60 may be locked with locks 62. The doors 60 are also preferably hinged away from the second platform 30 near the first platform 20 so that when the doors 60 are opened, the doors 60 hang down away from the second platform 30 to provide access to the storage compartments 50. In this way, the doors 60 close off the storage compartments 50 along the periphery of the storage system 10 for increased security.

Figure 3:
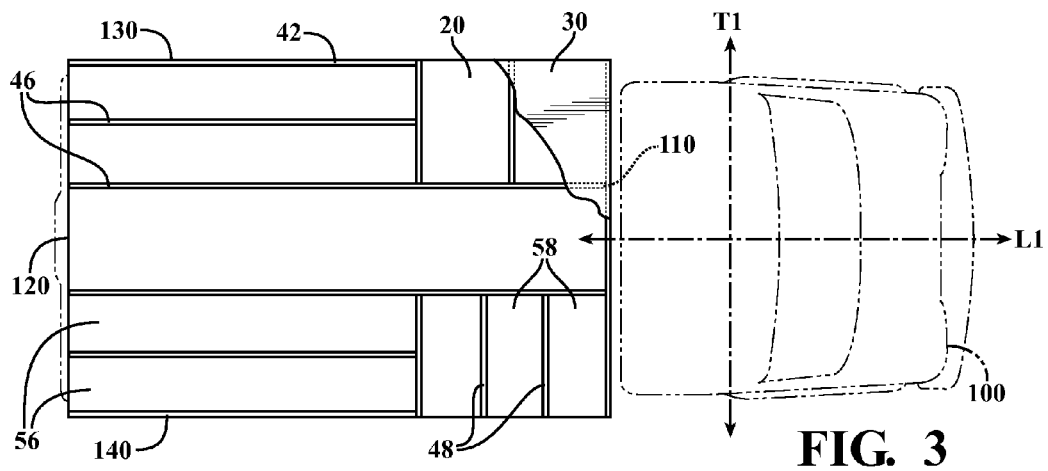
FIGS. 3-5 are overhead views illustrating exemplary non-limiting arrangements of the support braces which define the plurality of storage compartments.
Figure 4:
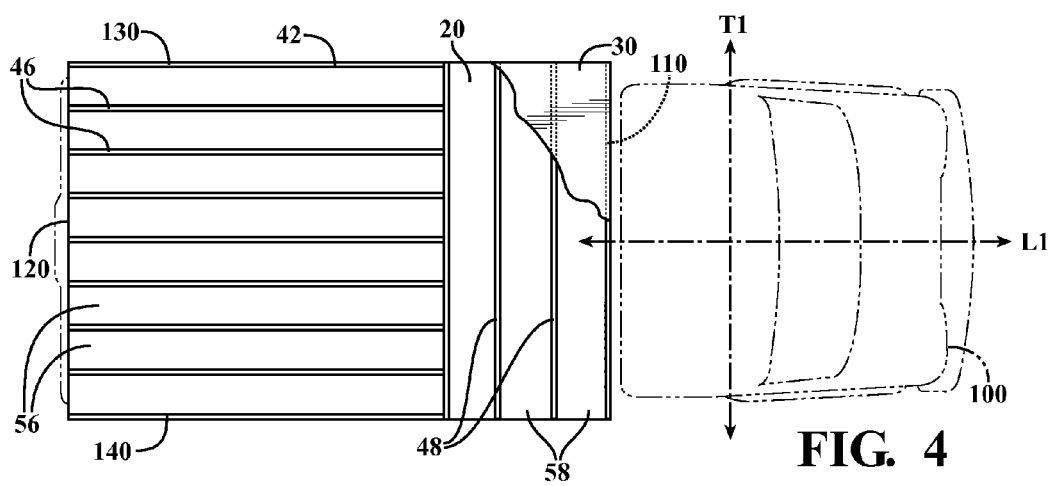
Figure 5:
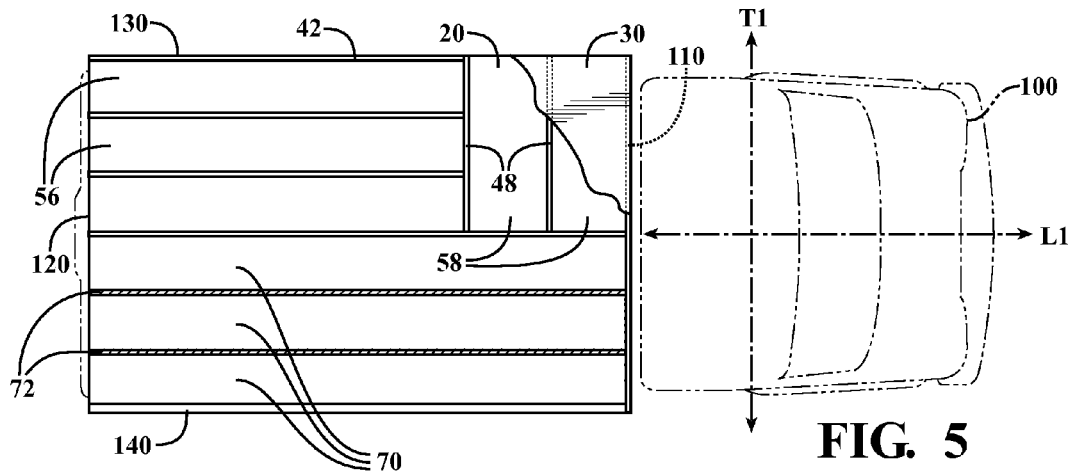

The arrangement of the support braces 40 may be customized to define storage compartments 50 according to an owner's specification. FIGS. 3-5 provide three nonlimiting examples of potential arrangements of the support braces 40 to define longitudinal storage compartments 56 and transverse storage compartments 58. The longitudinal axis L1 extends orthogonally between the front end 110 and the back end 120 of the storage system. Longitudinal support braces 46 are affixed to the first platform 20 along the longitudinal axis L1 to define the longitudinal storage compartments 56. Transverse support braces 48 are affixed to the first platform 20 along the transverse axis T1 to define transverse storage compartments 58.

As shown in FIG. 3, the longitudinal support braces 46 may be spaced transversely on the first platform 20 to define longitudinal compartments 56 having varying transverse widths. A portion of the longitudinal support braces 46 may extend along the entire longitudinal length of the storage system 10. Alternatively, the longitudinal support braces 46 may abut the transverse support braces 48 to define longitudinal compartments 56 that extend along only a portion of the longitudinal length of the cargo bed storage system 10. While the longitudinal storage compartments 56 are shown accessible via the back end 120 of the storage system 10, it is appreciated that the longitudinal storage compartments 56 may be accessible via the front end 110 of the storage system 10 or alternatively about the driver side 130 or the passenger side 140 of the storage system 10.

The transverse support braces 48 may be spaced longitudinally along the first platform 20 to define transverse storage compartments 58 having varying longitudinal widths. As shown in FIG. 4, the transverse support braces 48 may extend transversely from the driver side 130 to the passenger side 140 of the storage system 10 to define transverse storage compartments 58 that extend along the entire transverse width of the storage system 10. Alternatively, the transverse support braces 48 may abut the longitudinal support braces 46 to define transverse storage compartments 58 that extend along only a portion of the storage system's 10 transverse width as shown in FIGS. 3 and 5. The transverse storage compartments 58 may be accessible about the driver side 130 or passenger side 140 of the storage system 10.

It is appreciated that FIGS. 3-5 depict exemplary and non-limiting arrangements of the storage system 10. One skilled in the art will appreciate that the longitudinal support braces 46 and transverse support braces 48 may be arranged to create varying combinations of longitudinal storage compartments 56 and transverse storage compartments 58. Longitudinal storage compartments 56 may extend the entire longitudinal length of the storage system 10 or only a portion thereof. Similarly, transverse storage compartments 58 may extend the entire transverse width of the storage system 10 or only a portion thereof. As such, it is appreciated that the arrangement of the longitudinal and transverse support braces 46, 48 may be tailored to meet an individual owner's specifications.

In another embodiment of the present invention, the storage system 10 includes a plurality of support braces 40 affixed to the first platform 10 along with a plurality of compartment dividers 72 that are rearrangeable within the volume between the first platform 20 and the spaced apart second platform 30. The support braces 40 are affixed to the first platform 20 and the second platform 30 is affixed to the support braces 40. As shown in FIG. 5, the compartment dividers 72 may be removably affixed to the first and second platforms 20, 30 to define a plurality of subset storage compartments 70 within the volume. The compartment dividers 72 may be removably affixed to the first and second platforms 20, 30 with fasteners, brackets, or other removable methods known in the art. As shown in FIG. 5, the compartment dividers 72 define three subset storage compartments 70 on the passenger side 140 of the storage system 10. By removing the compartment dividers 72, a single storage compartment may be created on the passenger side 140 of the storage system 10 out of the three subset storage compartments 70. One skilled in the art will appreciate that the compartment dividers 72 may run along the longitudinal axis L1 or the transverse axis T1. It is also appreciated that the longitudinal support braces 46, transverse support braces 48, and compartment dividers 72 may be rearranged between the first and second platforms 20, 30 and within the volume to define various combinations of longitudinal compartments 56, transverse compartments 58, and subset storage compartments 70. In this way, the size and shape of all of the storage compartments 50 may be changed by the owner.

It is appreciated that the flatbed truck cargo bed storage system 10 still allows for conventional flatbed storage boxes to be mounted to the second platform 30. As such, the storage system 10 is compatible with existing flatbed truck customization options. In this way, owners can retrofit their flatbed trucks 100 with the storage system 10 and still make use of customized flatbed items already owned (not depicted herein).

A vehicle cargo bed storage system for a flatbed truck that raises a second platform of the flatbed truck to provide storage space between the second platform and the original first platform of the flatbed truck is provided. A plurality of support braces are affixed to the first platform and the second platform is affixed to the support braces so as to be spaced apart from the first platform to define a volume. The plurality of support braces define a plurality of storage compartments within the volume that are accessible about a periphery of the first and second platforms. A plurality of lockable doors about the periphery of the first and second platforms restricts access to the storage compartments.

The invention is not restricted to the illustrative examples described above. Examples described are not intended to limit the scope of the invention. Changes therein, other combinations of elements, and other applications will occur to those skilled in the art without deviating from the spirit of the described invention.

The invention claimed is:

1. A cargo bed storage system for a vehicle having a flatbed and a cab portion, the system mounted to an upper surface of the flatbed, the upper surface having a forward edge positioned adjacent to the cab portion, a rear edge and two lateral edges, the storage system comprising:
  a first platform, the first platform positioned on top of the upper surface of the flatbed, the first platform extending the full distance between the forward edge, the rear edge and the lateral edges;
  a plurality of support braces affixed to the first platform;
  a second platform affixed to the plurality of support braces, the second platform spaced apart from the first platform to define a volume, the second platform being equal in dimension as compared to the first platform, the second platform having a one piece upper surface, the entire one piece upper surface being continuous and uninterrupted;
  the support braces adapted to define a plurality of storage compartments within the volume, the storage compartments positioned between the first platform and the second platform, the storage compartments having a plurality of access openings, at least one of the access openings positioned at the rear edge of the upper surface, at least one of the access openings positioned at one of the lateral edges of the upper surface;
  the second platform adapted to fully cover the entirety of the volume, the storage compartments and the support braces within the system; and
  wherein the one piece upper surface of the second platform functions as a standard flatbed surface.

2. The storage system of claim 1, further comprising:
  a plurality of lockable doors about an outer peripheral edge of the first and second platforms, the lockable doors restricting access to the plurality of storage compartments.

3. The storage system of claim 1, further comprising:
  a front end of the storage system;
  a back end of the storage system;
  a longitudinal axis extending orthogonally between the front end and the back end; and
  wherein the support braces are affixed to the first platform along the longitudinal axis extending between the front end and the back end and the plurality of storage compartments are accessible about the back end of the storage system.

4. The storage system of claim 1, further comprising:
  a driver side of the storage system;
  a passenger side of the storage system;
  a transverse axis extending orthogonally between the driver side and the passenger side; and
  wherein the support braces are affixed to the first platform along the transverse axis extending between the driver side and the passenger side and the plurality of storage compartments are accessible about the driver side and the passenger side of the storage system.

5. The storage system of claim 1, further comprising:
  a front end of the storage system;
  a back end of the storage system;

a longitudinal axis extending orthogonally between the front end and the back end;
a driver side of the storage system;
a passenger side of the storage system;
a transverse axis extending orthogonally between the driver side and the passenger side;
a plurality of longitudinal support braces affixed to the first platform along the longitudinal axis to define a plurality of longitudinal storage compartments, the longitudinal storage compartments accessible about the back end of the storage system; and
a plurality of transverse support braces affixed to the first platform along the transverse axis to define a plurality of transverse storage compartments.

6. The storage system of claim 5, wherein the transverse storage compartments are accessible about the driver side of the storage system.

7. The storage system of claim 5, wherein the transverse storage compartments are accessible about the passenger side of the storage system.

8. The storage system of claim 5, wherein the transverse storage compartments are accessible about the driver side and the passenger side of the storage system.

9. The storage system of claim 1, further comprising:
a front end of the storage system;
a back end of the storage system;
a longitudinal axis extending orthogonally between the front end and the back end;
a driver side of the storage system;
a passenger side of the storage system;
a transverse axis extending orthogonally between the driver side and the passenger side
a plurality of longitudinal support braces affixed to the first platform along the longitudinal axis to define a plurality of longitudinal storage compartments, the longitudinal storage compartments accessible about the back end of the storage system;
a plurality of transverse support braces affixed to the first platform along the transverse axis to define a plurality of transverse storage compartments; and
wherein a portion of the longitudinal support braces abut at least one of the transverse support braces.

10. The storage system of claim 9, wherein a portion of the transverse support braces abut at least one of the longitudinal support braces.

11. A cargo bed storage system for a vehicle having a flatbed and a cab portion, the system mounted to an upper surface of the flatbed, the upper surface having a forward edge positioned adjacent to the cab portion, a rear edge and two lateral edges, the storage system comprising:
a first platform, the first platform positioned on top of the upper surface of the flatbed the first platform extending the full distance between the forward edge, the rear edge and the lateral edges;
a plurality of support braces affixed to the first platform;
a second platform affixed to the plurality of support braces, the second platform spaced apart from the first platform to define a volume, the second platform being equal in dimension as compared to the first platform, the second platform having a one piece upper surface, the entire upper surface being continuous and uninterrupted;
a plurality of compartment dividers rearrangeable within the volume; and
wherein the support braces and the compartment dividers define a plurality of storage compartments within the volume, the first platform and the second platform further defining the plurality of storage compartments having, the plurality of storage compartments a plurality of access openings, at least one of the access openings positioned at the rear edge of the upper surface, at least one of the access openings positioned at one of the lateral edges of the upper surface; and
wherein the one piece upper surface of the second platform functions as a standard flatbed surface.

12. The storage system of claim 11, further comprising:
a plurality of lockable doors about an outer peripheral edge of the first and second platforms, the lockable doors restricting access to the plurality of storage compartments.

13. The storage system of claim 11, wherein the support braces define
a plurality of subset storage compartments within the volume, and
the plurality of compartment dividers are rearrangeable within the subset storage compartments.

* * * * *